United States Patent [19]

Toepel

[11] Patent Number: 4,899,915

[45] Date of Patent: Feb. 13, 1990

[54] SILO FOR BULK GOODS

[75] Inventor: Fritz Toepel, Heidelberg, Fed. Rep. of Germany

[73] Assignee: Heidelberger Zement AG, Heidelberg, Fed. Rep. of Germany

[21] Appl. No.: 647,997

[22] Filed: Sep. 6, 1984

[30] Foreign Application Priority Data

Sep. 7, 1983 [DE] Fed. Rep. of Germany ....... 3332226

[51] Int. Cl.⁴ .............................................. B65D 8/26
[52] U.S. Cl. ................................................... 222/459
[58] Field of Search .......................... 222/459, 185, 77; 52/197, 195; 181/224, 252

[56] References Cited

U.S. PATENT DOCUMENTS

| D. 235,340 | 6/1975 | Mize | 222/185 X |
| 2,704,504 | 3/1955 | Wilkening | 181/224 X |
| 3,094,243 | 6/1963 | Haugen | 222/459 X |
| 4,336,863 | 6/1982 | Satomi | 181/224 |

FOREIGN PATENT DOCUMENTS 1035892 9/1953 France .................................. 52/197

Primary Examiner—Joseph J. Rolla
Assistant Examiner—David H. Bollinger
Attorney, Agent, or Firm—Michael Klotz

[57] ABSTRACT

The invention relates to a container for bulk goods in substantially solid form, having a central conduit arranged in the center of the container and between the inlet opening and the outlet opening, the conduit having openings in its wall for connection with the body of the container.

The invention further relates to a method of evacuation of a container containing bulk goods in substantially solid form, the container having a central conduit extending between the inlet opening and the outlet opening and openings in the conduit for connection with the body of the container, which method comprises maintaining a lower material pressure of the bulk goods in the conduit in the area above the outlet point than in other areas in the conduit and in the body of the container. The invention further relates to a method for emptying the container by maintaining the material pressure of the bulk goods in the conduit in the area above the outlet point at below a specified value.

10 Claims, 5 Drawing Sheets

SILO FOR BULK GOODS

This invention relates to a container for bulk goods in substantially solid form, such as cement, coal, coke and other goods of similar nature. This invention relates in particular to containers in the shape of silos, hoppers or bunkers, particularly large size containers, having a central outlet or evacuation opening.

This invention further relates to a method for the substantially noise-free evacuation of such container, as more particularly described.

Containers for bulk goods, such as silos, hoppers or bunkers, and particularly containers of large size, intended for filling with bulk goods, such as cement, coal, coke or similar solid materials, present a problem in their evacuation or emptying, in that the evacuation can often not be effected with complete continuity. The evacuation or emptying, particularly of containers of large size and containing bulk goods in large pieces, produces considerable noise and vibration, which disturbs the residents of surrounding areas. This noise pollution can lead to complaints and even to regulation by public authorities.

It is an object of the invention to remedy this situation and to solve the problem caused in the evacuation or emptying of containers for bulk goods, particularly containers of large size.

It is a further object of the invention to provide a container, which can be evacuated or emptied with a minimum of noise or vibration, speedily and efficiently.

It is a further object of the invention to provide containers for bulk goods, such as silos, hoppers or bunkers, which can store large quantities of such bulk goods, and yet be capable of efficient, speedy as well as noise-free evacuation.

These and other objects of the invention are achieved in accordance with the invention by providing a substantially upright container for bulk goods in substantially solid form, having a frame, a base and support members to maintain the container in a substantially upright position, at least one inlet opening for filling the container and at least one outlet opening for emptying the container, and a generally cylindrical conduit inside the container, extending between the inlet opening and the outlet opening, for emptying the container, said conduit having openings in its wall for connection with the body of the container.

These and other objects are further achieved in accordance with the invention by a method of evacuation of a container containing bulk goods, in substantially solid form, said container being substantially upright and having a frame, a base and support members to maintain the container in a substantially upright position, at least one inlet opening for filling the container and at least one outlet opening for evacuating the container, and a generally cylindrical conduit inside the container, extending between the inlet opening and the outlet opening, for evacuating the container, said conduit having openings in its wall for connection with the body of the container, which method comprises maintaining a lower material pressure of the bulk goods in the conduit in the area above the outlet point than in other areas in the conduit and in the body of the container.

The containers in accordance with the invention are of generally large size and have a height of from 15 to 30 m., but can extend up to 40 m. or more in height. Generally, the containers have a substantially circular base and are cylindrical in their form. However, if desired, the containers may have a shape other than cylindrical or other than regular circular or cylindrical, if the nature of the bulk goods stored makes such shape desirable. The bulk goods commonly stored in the containers are generally granular goods, made of discrete, jagged and hard solid particles, having a particle size between 0.1 and 30 mm. However, larger particles of an average diameter of 3 cm. and also much smaller particles, such as fines, may also be present. The bulk density of the bulk goods is generally high and may be as high as 1.5 tons/m$^3$.

The origin of the noise and vibration encountered when evacuating or emptying such containers containing the bulk goods is not well understood. It is believed by some experts in the field that the noise and the vibration may be caused by the presence of discrete layers or strata of the bulk goods in loose form and without sufficient cohesion between the particles to maintain the relative position when poured. These layers or strata function as quasi-hollow spaces which, at their relative size, are no longer able to support the pressure of the thicker layers or strata, lying above them. The thick layers or strata, in turn, function as quasi-bridges, which support the heavier layers or strata of the bulk goods above the looser layers or strata. Conversely, the looser layers or strata, positioned under such quasi-bridges, function as quasi-hollow spaces. It is believed that the bridged-over quasi-hollow spaces will often collapse after reaching a certain critical size. The bulk density of the material, and therefore its pressure compared to the pressure in repose, will diminish when the bulk goods are evacuated or withdrawn. However, the flow of the material takes place only when the material is in a state of repose.

In accordance with the invention, the container includes a generally cylindrical conduit inside the container, extending between the inlet opening and the outlet opening, for emptying the container. Since the flow of the bulk goods in the conduit is in a vertical direction to the outlet point, the pressure exerted by the layer or stratum can be directly controlled in the conduit in the way desired.

The container of the invention includes at least one such conduit, corresponding to the outlet opening of the container. However, if the container includes a plurality of outlet openings, a corresponding number of conduits may be included in the container, one conduit to one outlet opening.

The generally cylindrical conduit is provided with openings in its wall for connection with the body of the container. Preferably, the conduit will have a plurality of openings, spaced along the length of the conduit, advantageously substantially evenly spaced along the length of the conduit.

The conduit may be placed a specified distance under the frame of the container, where the remaining space between the top of the conduit and the frame does not have sufficient space to contain the bulk goods, with the consequence that a layer or stratum of bulk goods is formed in which the bulk goods can flow and yet have a vertical pressure, which is above the desirable value. It might be expected that the operational mode would then be such that the bulk goods are conveyed over the total length of the conduit, such as a tube or pipe, through the various openings from the body of the container to the conduit, and possibly also in the opposite direction, from the conduit back to the body of the container. Contrary to all expectations, the flow in the opposite direction does not take place. Instead, the bulk goods inside the conduit flow in an almost ideal piston flow in the direction of the outlet opening. Since this piston flow takes place only in the conduit, more bulk goods constantly follow in the conduit from the body of the container and from above the first layer or stratum. This continuous flow of the bulk goods from the body of the container takes place in general at the surface of the bulk goods in the body of the container, in which, however, a vertical pressure prevails, which is under the critical value. In this way, the container can be evacuated or emptied in a nearly ideal fashion.

It is not usually necessary to provide a large number of openings over the length of the conduit. It is sufficient to ensure that the distance between the openings along the length of the conduit does not exceed a certain specified value. This value is calculated in a way to ensure that the vertical pressure of the bulk goods in the body of the container does not reach a certain critical value. This is because only such quantity of the bulk goods inside the body of the container is formed and is to be removed, as can correspond to the spacing between the single openings over the length of the conduit. This is, however, ensured by the fact that the bulk goods flow from the body of the container into the conduit only through the openings which lie above the topmost surface of the bulk goods in the conduit. The diameter of the conduit would therefore be preferably selected to be as small as possible. On the other hand, the load capacity limit of the conduit would necessarily impose a lower limit on the diameter of the conduit. The design and the dimensions of the conduit, the openings in the conduit, the pressure exerted in different areas of the conduit by a layer or stratum of the bulk goods and other design considerations will be readily calculated and/or measured by the person skilled in the art on the basis of the above discussion of the mechanism and criteria governing the flow of the bulk goods in the conduit.

The conduit is preferably provided on its inside wall with a sound-absorbing layer, so as to reduce the noise caused by the impact of the bulk goods and to absorb the vibration, created by the impact of the bulk goods. The sound-absorbing layer is preferably made of an igneous rock material, such as basalt or the like. However, other suitable materials may also be used and will be familiar to persons skilled in the art for use for the purpose stated. The conduit may also be provided on its inside wall with a baffle or impact rings, for retaining the descending bulk goods material and absorbing the vibration caused by the flow and the descent. The baffle or impact rings are preferably placed perpendicularly to the direction of the flow of the bulk goods, in order to impede the direct contact of the bulk goods with the inner wall of the conduit. In this way, a substantially noise-free zone can be provided at the interface of the wall of the container with the incoming bulk goods layers, to absorb or reduce the vibrations caused by the flow of the bulk goods and their impact on the wall.

The conduit in accordance with the invention may extend substantially from the inlet opening of the container to the outlet opening. In this embodiment of the invention, the openings in the conduit will serve as inlet openings at the various height levels of the container. The container will then be loaded and also emptied through the openings in the wall of the conduit. In accordance with another aspect of the invention, a divider insert is provided in the conduit, under the inlet opening to the container, for receiving and conveying the bulk goods from the inlet opening to the body of the container. The divider insert may be in the form of a divider cone or in the form of a divider plate, acting to receive the incoming bulk goods and directing them into the body of the container, through the openings in the conduit directly above the divider cone or divider plate. If the container is provided with a plurality of outlet openings, a corresponding number of conduits is provided, with, if desired, a suitable number of divider inserts, such as divider cones or divider plates.

In accordance with a further aspect of the invention, a method is provided for maintaining a lower material pressure of the bulk goods in the conduit in the area above the outlet point than in other areas in the conduit and in the body of the container. For the purpose of measuring the material pressure in an area of the conduit or in other areas, suitable means can be provided for weighing a portion of the layer of the bulk goods. Such means will be well known to the person skilled in the art, for conducting the method of the invention accurately and efficiently. In accordance with a further aspect of the invention, the method of the invention may comprise maintaining the material pressure of the bulk goods in the conduit in the area above the outlet point below a specified value. The person skilled in the art will be well familiar with the manner of calculating such value, in accordance with the design considerations above referred to.

The invention will now be illustrated by means of the accompanying drawings, it being understood that the scope of the invention is by no means limited to the embodiments illustrated and that the invention should be understood as extending to the entire scope of the invention as claimed.

The accompanying drawings comprise:

FIG. 1, which shows a vertical cross-section through a substantially cylindrical upright container, provided with a central conduit;

Figure 2:
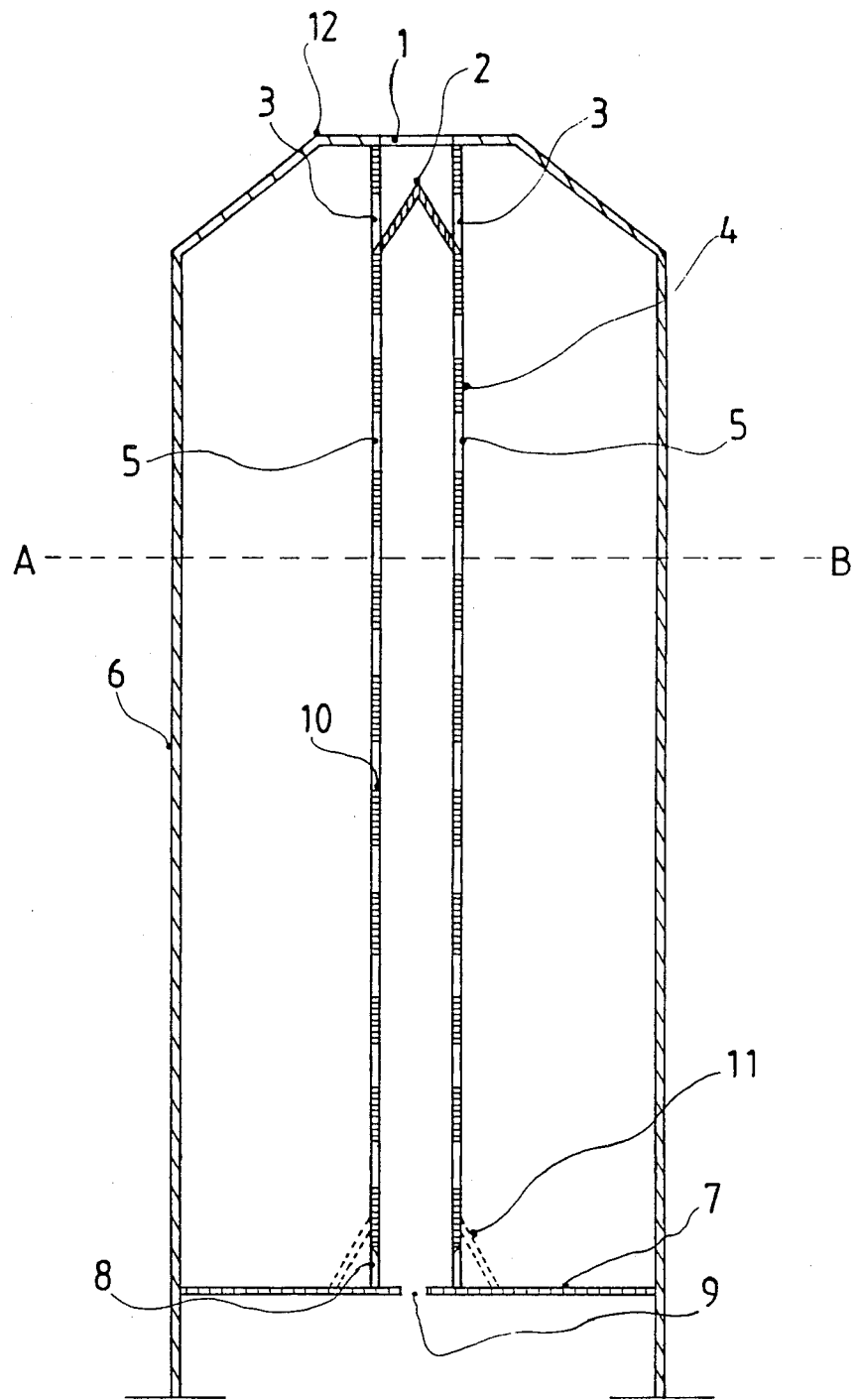
FIG. 2 shows a vertical cross-section through a substantially cylindrical container with a substantially flat base, also provided with a central conduit.
Figure 3:
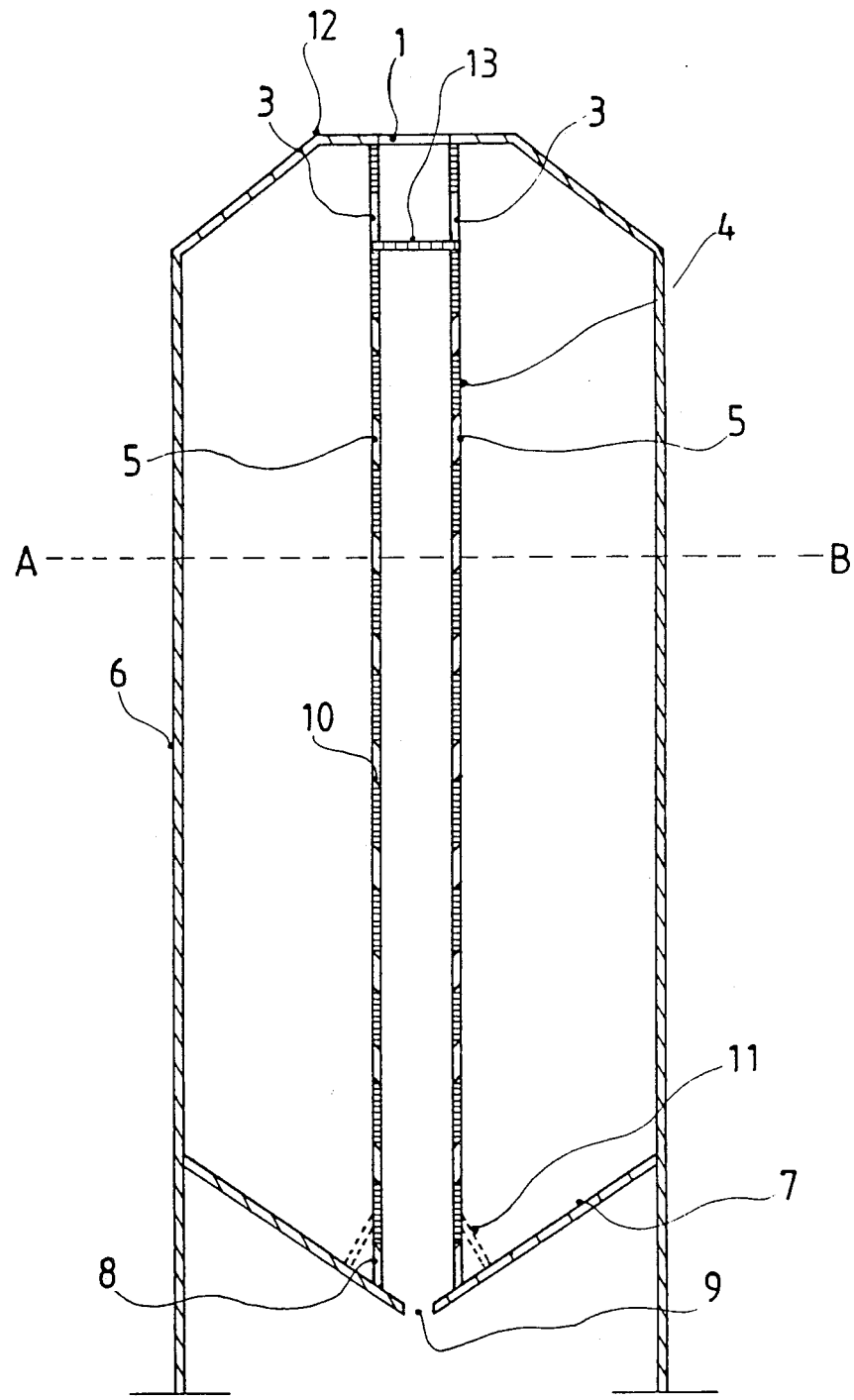
FIG. 3 shows a vertical cross-section through the container illustrated in FIG. 1, this embodiment being provided with a divider insert in the form of a plate.
Figure 4:
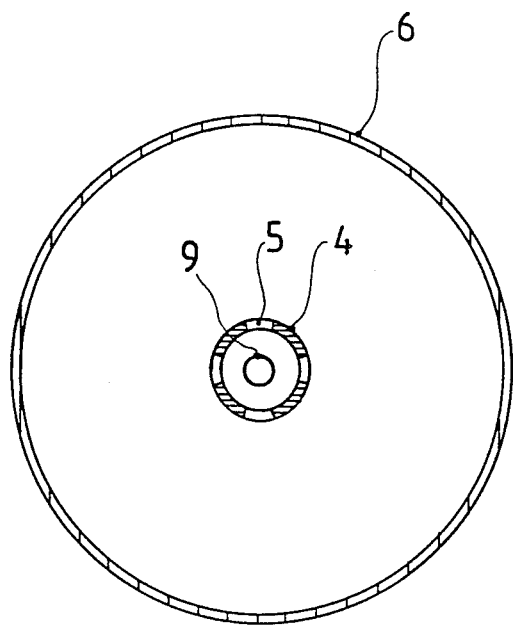

FIG. 4 shows a section through line A-B of FIGS. 1, 2 and 3, and FIGS. 5 and 6 show a vertical cross-section of a portion of the conduit illustrated in FIGS. 1, 2, 3 and 4.

The embodiments of the invention illustrated in the accompanying drawings show a container in the form of a silo, having a height of 40 m. and an inside diameter of 16 m. The illustrated silo is made of concrete but can also be made of other suitable material, such as metal or stone.

Figure 1:
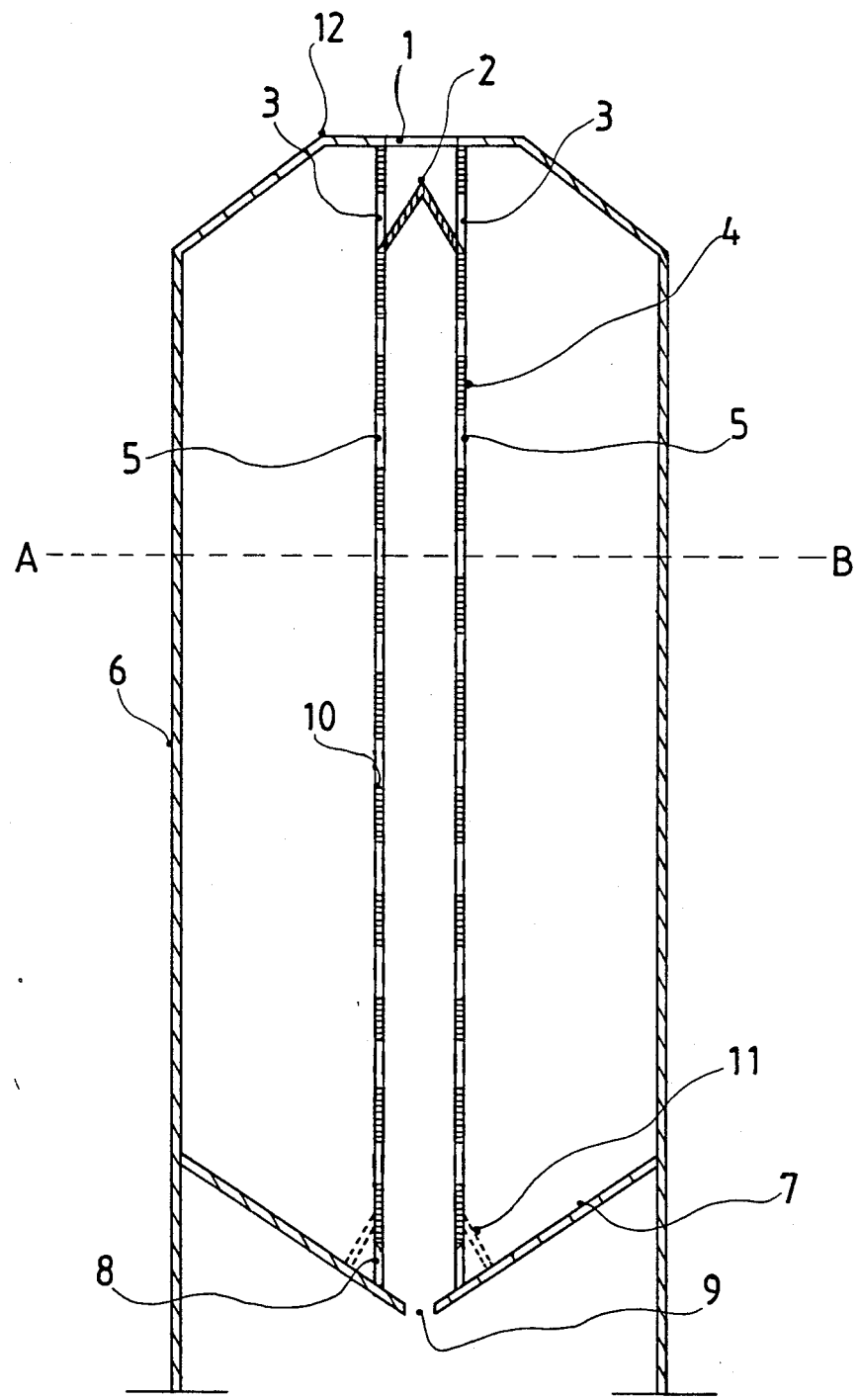

The embodiment illustrated in FIG. 1 shows a container in the form of a silo having upper frame 12, a side wall 6 and a base 7. A tubular conduit 4 is provided in the center of the container, extending from the inlet opening 1 to the outlet opening 9. Struts 11 are provided as support members at the outside wall of the conduit, in order to maintain it in a substantially upright position. The conduit is provided with opening 5, spaced along the length of the conduit 4. The lowermost opening in the conduit 4 is referenced as 8. A conical insert 2 is provided inside the conduit 4, below the inlet opening 1 for receiving the incoming bulk goods and directing them through the openings 3 in the conduit 4 into the body of the container. The perimeter of the opening is referenced as 10.

The inside diameter of the conduit 4 in this illustrated embodiment measures 2 m., being chosen to be as small as possible in relation to the inside diameter of the container. The outlet opening 9 is arranged in the center of the base 7 of the container. In the illustrated embodiment, the openings 5 are provided at equal intervals of about 3.5 m. In the illustrated embodiment, the conduit 4 has a normal cylindrical shape, extending from the inlet opening 1 to the container base 7.

FIG. 2 illustrates a further embodiment of the invention, similar to the embodiment illustrated in FIG. 1. In this embodiment, the container has a base 7, which is flatter than the base 7 illustrated in FIG. 1.

FIG. 3 of the accompanying drawings illustrates a container similar to the container illustrated in FIG. 1. In this embodiment, a divider plate 13 is provided in the conduit 4, in place of the divider cone 2 of FIG. 1. The divider plate 13 is positioned below the inlet opening 1 in frame 12. The openings 3 in the conduit 4 are provided above the divider plate 13, for directing the incoming bulk goods from the inlet opening 1 into the body of the container. The divider plate is often preferred to the divider cone, as it makes it possible for a substantial layer of the incoming bulk goods to form, which can then protect the divider plate from the incoming further bulk goods. The divider plate can be provided, if desired, with a closable opening for the inspection of the central conduit 4. By way of example, the openings 5 will have a width of 60 cm. and a length of approximately 1 m., to ensure a speedy and efficient operation.

FIG. 4 of the accompanying drawings shows a cross-section along the line A-B of FIGS. 1, 2 and 3. FIG. 4 shows four inlet openings 5 and sections of the conduit 4, between which the openings 5 extend. The figure further shows the outlet opening 9 and the container wall 6.

Figure 5:
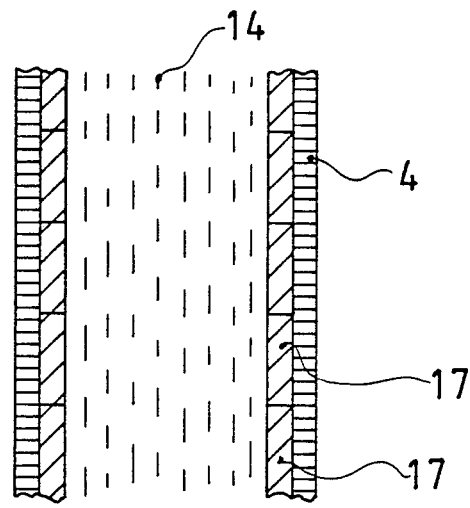

FIG. 5 shows a vertical cross-section through a portion of the conduit 4. A sound-absorbing layer 17 is provided on the inside wall of the conduit 4. Reference numeral 14 illustrates a particle of the incoming flowing bulk goods.

Figure 6:
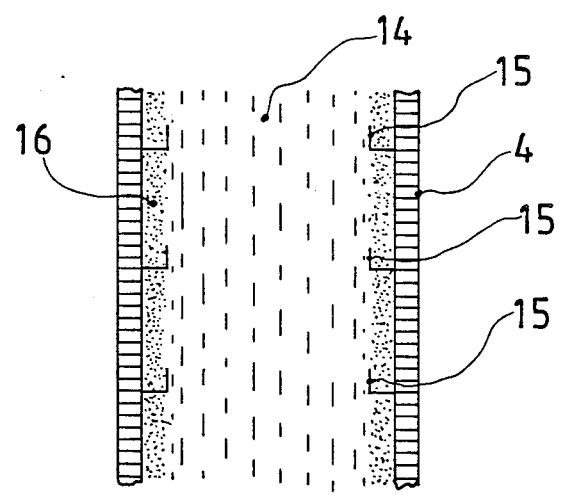

FIG. 6 of the accompanying drawings further shows a vertical cross-section through a portion of the conduit 4. In place of the sound-absorbing layer 17 of FIG. 5, this figure illustrates the placing of baffle or impact rings 15 on the inside wall of the conduit 4, in order to impede the flow of the incoming bulk goods and to form at the inside perimeter of the conduit 4 a substantially noise-free zone. The noise-free zone in this embodiment is referenced as 16 and a particle of the incoming flowing bulk goods is illustrated as 14. In this embodiment, the incoming bulk goods are divided between the substantially noise-free zone, where they are substantially retained and their flow impeded, and the free fall zone, containing the flowing particles 14.

It will be appreciated from the foregoing description and the accompanying drawings that the solution in accordance with the invention can be considered as a static solution, in contrast to dynamic or mechanical solutions, which make use of moving parts, such as vibrators. The static solution is provided through the use of the central conduit as well as the use in the conduit of a divider insert, a sound-absorbing lining and/or baffle or impact rings. Because of its static nature, the container of the invention requires no added energy for its operation. It is therefore very inexpensive in use. The container of the invention also undergoes less tear and wear than containers based on a dynamic solution, which use, for example, a vibrator. The apparatus and the method of the invention are also well adapted for refitting or revamping of existing containers, as such existing containers may be readily equipped with the features illustrated and claimed herein. Such features are of no detriment to the existing containers, as they will outlast even the container walls in the evacuation or emptying of bulk goods. The refitting or revamping of existing containers is often not feasible, when using dynamic solutions.

Numerous modifications and variations of the present invention are possible in the light of the above teachings and, therefore, within the scope of the appended claims the invention may be practiced otherwise than as particularly described.

What is claimed is:

1. A substantially upright container for bulk goods in substantially solid form, having a frame, a base and support members to maintain the container in a substantially upright position, an inlet opening for filling the container and an outlet opening for emptying the container, and a generally-cylindrical conduit inside the container, extending between the inlet opening and the outlet opening, for emptying the container, said conduit having openings in its wall for connection with the body of the container, said container having a sound-absorbing layer adhering to the inside wall of the conduit, for direct contact with the bulk goods in the conduit.

2. The container claimed in claim 1, having a plurality of openings, spaced along the length of the conduit.

3. The container claimed in claim 2, in which the openings are substantially evenly spaced along the length of the conduit.

4. The container claimed in claim 1, having a divider insert, positioned under the inlet opening to the container, for receiving and conveying the bulk goods from the inlet opening to the body of the container.

5. The container claimed in claim 4, in which the divider insert is in the form of a plate.

6. The container claimed in claim 4, in which the divider insert is in the form of a cone.

7. The container claimed in claim 1, having baffle rings on the inside wall of the conduit, for direct contact with the bulk goods in the conduit.

8. The container claimed in claim 1 in which the sound-absorbing layer is made of igneous rock material.

9. The container claimed in claim 8, in which the igneous rock material is basalt.

10. A method of loading and unloading bulk goods in substantially solid form into and from a substantially upright cylindrical container in a manner to substantially prevent vibration and noise while loading or unloading, comprising providing an inlet opening at the upper center of the container, providing an outlet opening at the base of the container, placing a central conduit in a substantially upright position in communication with said inlet opening and said outlet opening, providing a sound-absorbing layer adhering to the inside wall of the conduit, providing openings in the walls of said conduit along the length thereof, so as to afford continuous communication between the body of the container surrounding the conduit and said outlet opening, via said openings and the interior of the conduit, and providing means for causing the bulk goods in substantially solid form to be directed toward the side walls of the container whereby said bulk goods are caused to descend by gravity downwardly towards said conduit openings, whereby the bulk goods, loaded at the inlet opening, enter the conduit, having the sound-absorbing layer adhering thereto, from the upper layer of the bulk goods in said container, and are unloaded by gravity through said outlet opening.

* * * * *